United States Patent
Mondero et al.

(10) Patent No.: US 11,481,674 B2
(45) Date of Patent: Oct. 25, 2022

(54) DIGITAL CONTENT COMMUNICATIONS SYSTEM FOR ACCOUNT MANAGEMENT AND PREDICTIVE ANALYTICS

(71) Applicant: ACCENTURE GLOBAL SOLUTIONS LIMITED, Dublin (IE)

(72) Inventors: Earl Josef Mondero, Cebu (PH); Karl J. G Rosales, Pasig (PH); Ma Rafaela G Manasan, Quezon (PH); Darryl J. T. David, Marikina (PH); Rouselle A. Malgapo, Malabon (PH); Rafael D. Ramirez, Paranaque (PH); Nonna J. Parrilla, Mandaluyong (PH); Ana Liza G. Baquiano, Talisay (PH)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 427 days.

(21) Appl. No.: 16/511,768

(22) Filed: Jul. 15, 2019

(65) Prior Publication Data
US 2020/0019886 A1    Jan. 16, 2020

Related U.S. Application Data

(60) Provisional application No. 62/697,683, filed on Jul. 13, 2018.

(51) Int. Cl.
*G06N 20/20* (2019.01)
*G06N 20/00* (2019.01)
*G06Q 30/00* (2012.01)

(52) U.S. Cl.
CPC .......... *G06N 20/00* (2019.01); *G06Q 30/012* (2013.01)

(58) Field of Classification Search
CPC ........ G06N 20/00; G06N 20/20; G06N 5/003; G06N 20/10; G06Q 30/012
See application file for complete search history.

(56) References Cited

U.S. PATENT DOCUMENTS

| | | | |
|---|---|---|---|
| 10,229,370 B1* | 3/2019 | Merritt | H04M 3/4365 |
| 2005/0182502 A1* | 8/2005 | Iyengar | G06N 20/00 700/90 |
| 2014/0200999 A1* | 7/2014 | Canny | G06Q 30/0251 705/14.54 |

OTHER PUBLICATIONS

Predicting Motor Vehicle Crashes Using Support Vector Machine Models; Xiugang Li et al.; Apr. 28, 2008. (Year: 2008).*

(Continued)

*Primary Examiner* — Yehdega Retta
(74) *Attorney, Agent, or Firm* — Mannava & Kang, P.C.

(57) ABSTRACT

A digital content communications system for providing customer or product support using predictive analytics is provided. The system may include an analytics subsystem that communicates with one or more servers and one or more data stores in a network. The analytics subsystem may include a data access interface to receive a first set of data associated with a plurality of users or user accounts from a first data source, and to receive a second set of data associated with a plurality of users or user accounts from a second data source. The analytics subsystem may include processor to: prepare the first set of data; train a model using the first set of prepared data, wherein the model is at least one of a cancel-defer-go live model, a regular-extended warranty model, or a phase duration forecasting model. The processor may also prepare the second set of data; run the second set of data through the trained model; generate predictions based on running the second set of data that ran through the trained model; and provide at least one multi-modal output based on the generated predictions.

20 Claims, 12 Drawing Sheets

(56) References Cited

OTHER PUBLICATIONS

Model of Customer Churn Prediction on Support Vector Machine; XIA Guo-en et al. Sep. 2008 (using SVM) (Year: 2008).*
Analytics: Key to go from generating big data to deriving business value Deepali Aroral, Piyush Malik; 2015 IEEE First International Conference on Big Data Computing Service and Application; (Year: 2015).*

* cited by examiner

| | Design | Build | Test | UAT | Deploy | Support |
|---|---|---|---|---|---|---|
| Algorithm | Poisson | Poisson | Poisson | Poisson | Support Vector Machine | Poisson |
| Predictors | Driving business factor: Shift | Mobile App Use | Assignment Date | Assignment Date | Assignment Date | Assignment Date |
| | Modules Scope | Modules Scope | Modules Scope | Modules Scope | Current Payroll System | Size of Business |
| | Training | HOT point: Implementation | Size of business | Industry | Current TKS | Industry |
| | Expected to go live | | Industry | | HOT point: Configuration | |
| Pseudo $R^2$ | 95% | 56% | 81% | 96% | 94% | 67% |

DIGITAL CONTENT COMMUNICATIONS SYSTEM FOR ACCOUNT MANAGEMENT AND PREDICTIVE ANALYTICS

PRIORITY

This patent application claims priority to U.S. Provisional Patent Application No. 62/697,683, entitled "Digital Content Communications System for Account Management and Predictive Analytics," filed on Jul. 13, 2018, which is hereby incorporated in its entirety.

TECHNICAL FIELD

This patent application relates generally to digital content communications, and more specifically, to systems and methods for digital content communications for account management and predictive analytics.

BACKGROUND

Digital content communications is becoming increasingly prevalent in the modern world. Finding ways communicating data over a network in a secure and efficient manner is critical. Digital content is typically communicated over one or more communication channels, such as copper wires, optical fibers, wireless communication, storage media, and computer buses. As more and more digital content is communicated, the number of technological offerings based on digital content has increased. These include advances in areas related to mobile telecommunications, video streaming, and various electronic or mechanical goods or services, such as software services and provisioning.

With each of these offerings, customers require assistance in planning, installation, training, troubleshooting, maintenance, upgrading, extending, or termination of a product or service. Support may be provided over email, phone, fax, text, message, live sessions, forums, websites, or chatrooms or webchats. Because there are a plethora of available support services and a multitude of support delivery schemes, a support management platform may be a helpful tool to help ensure customer and product support in a timely and efficient way, both by the provider and to customer.

Conventional systems for providing product or customer support typically rely heavily on human resources or limited piecemeal approaches. Such techniques can be cumbersome, costly, and inefficient, especially in a modern context where digital identities associated with accounts of various, organizations, and products are constantly changing.

As a result, a more robust and holistic approach for digital content communications using account management and predictive analytics may be imperative to overcome the shortcomings of conventional systems and methods.

BRIEF DESCRIPTION OF DRAWINGS

Features of the present disclosure are illustrated by way of example and not limited in the following Figure(s), in which like numerals indicate like elements, in which:

FIG. 7A-7B illustrate diagrams for phase duration forecasting in a digital content communications system for account management and predictive analytics, according to an example;

DETAILED DESCRIPTION

Figure 1:
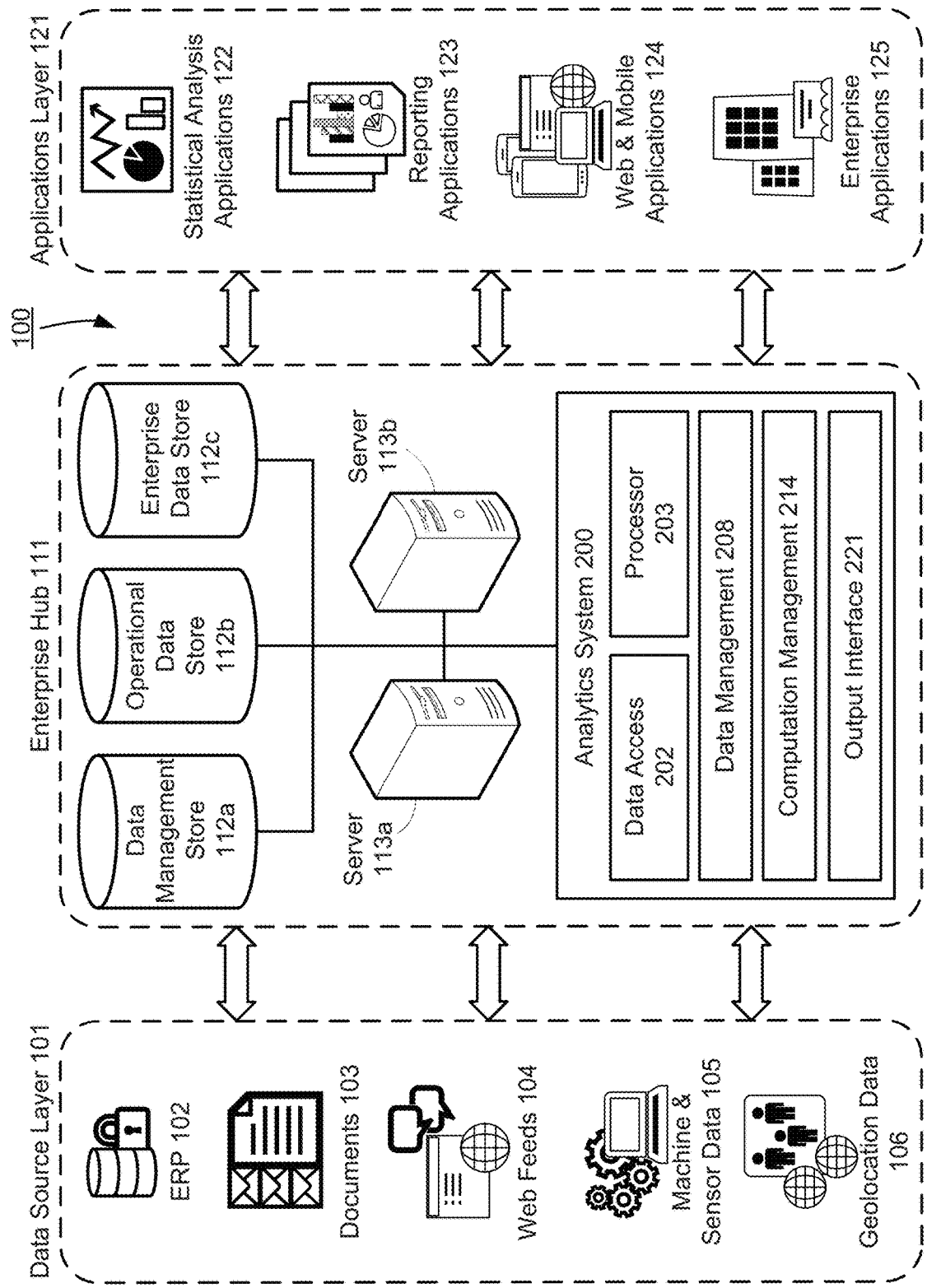
FIG. 1 illustrates an architecture for a digital content communications system for account management and predictive analytics, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, technologies in digital content communications often requires providing assistance in planning, installation, training, troubleshooting, maintenance, upgrading, extending, or termination of a product or service. Organizational entities that offer support to its partners, clients, or various affiliates may provide support over email, phone, fax, text, message, live sessions, forums, websites, chatrooms or webchats, or other channel. At times, a support management platform may be relied upon to help ensure customer and product support in a timely and efficient way, both by the provider and to customer. However, conventional systems for providing product or customer support typically rely heavily on human resources or limited piecemeal approaches, which are often cumbersome, costly, and inefficient. They are unfortunately ill-equipped to provide adequate support in scenarios where digital identities associated with accounts of various, organizations, and products are constantly changing.

According to examples described herein, an analytics-based support management platform may be provided for predictive modeling and account management intelligence to enhance digital content communication. Furthermore, a more robust and holistic approach for digital content communications using account management and predictive analytics may be imperative to overcome the shortcomings of conventional systems and methods.

As described herein, a digital content communications system using account management and predictive analytics may be provided. In an example, the digital content communications system may reduce complexity of conventional systems that require manual resources or cumbersome coordination of several components or approaches. And for specific applications directed to managing implementation of product support solutions, the digital content communications system may provide predictive analysis of likelihood of accounts being cancelled, deferred, or going live as scheduled. Using this information, the digital content communications system may also determine whether a customer should remain on a regular warranty or require extended warranty. This may be based on a client profile, current status, or other information. Furthermore, the digital content communications system may provide predictive forecasting for duration product phases, such as analysis, design, build, etc.

The digital content communications system described herein may therefore allow an organization entity (e.g., commercial, financial, government, etc.) to engage with users and provide a deeper level of product support using account management and predictive analytics. In this way, the digital content communications system may provide a more expedient, less error prone, and more intelligent approach to customer and product support.

FIG. 1 illustrates an architecture for a digital content communications system for account management and predictive analytics, according to an example. The digital content communications system 100 may be used to monitor and analyze data. In particular, the digital content communications system 100 may be used monitor and analyze data in an enterprise environment for an organizational entity. The organizational entity may be a financial entity, a commercial entity, a government entity, or other entity. The digital content communications system 100 may also store information or be able to receive information from a variety of internal, external, or other data sources associated with the organizational entity, its members, affiliates, partners, and/or its customers, suppliers, clients, or other parties. For example, the digital content communications system 100 may use account management and predictive analytics to help provide digital content communications. The digital content communications system 100 may further include a clustering system to provide predictive analytics or other similar features using data.

The digital content communications system 100 may operate in a network or an enterprise environment where data is exchanged, and where products or services are being offered to customers. More specifically, the digital content communications system 100 may provide real-time or near real-time monitoring and analysis of data exchange and data storage, as well as an artificial intelligence system that uses analytics and predictive modeling. The enterprise environment of the digital content communications system 100 may include a data source layer 101, an enterprise hub 111, and an applications layer 121. The data source layer 101 may include systems, subsystems, applications, and/or interfaces to collect information from enterprise resource planning (ERP) systems and applications 102 (hereinafter "ERR"), documents 103, web feeds 104, machine and sensor data 105 (hereinafter "sensor data"), and geolocation data 106, all of which may be distinct or integrated with the digital content communications system 100. The data source layer 101 may include other data or information sources as well. It should be appreciated that each of these data sources may further include its own data feed, storage, system, application, or other source for collecting and sending data and information, including third party or indirect sources.

The ERP 102 may include one or more application servers that host various ERP applications. These may include, for example, a customer relationship management (CRM) platform, system, or application. The ERP 102 may collect, store, manage, and interpret data associated with various enterprise functions or activities. The ERP 102 may provide an integrated and continuously updated view of core business processes using common databases maintained by a database management system. The ERP 102 may track enterprise resources (e.g., cash, raw materials, production capacity, etc.) as well as other information, such as corporate or business transactions (e.g., orders, purchase orders, payroll, ticketing, etc.). Furthermore, the applications that make up the ERP 102 may share data across various departments (e.g., manufacturing, purchasing, sales, accounting, etc.) that provide the data. The ERP 102 may facilitate information flow between many enterprise functions and may manage communications with stakeholders or other outside parties. As a result, the ERP 102 may contain large quantities of information and data.

The documents 103 may provide another source of data. Data received at the documents 103 may include files, emails, faxes, scans, or other documents that are transmitted, received, and stored in an enterprise or personal use environment.

The web feeds 104 may be yet another source of data. Data received at the web feeds 104 may include data from various web sources, such as websites, social media, syndication, aggregators, or from scraping. Websites may include uniform resource locator (URL) or other website identifier. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

The machine and sensor data 105 may be another source of data and information in an enterprise environment. For example, in an enterprise network, there may be physical mobile devices, vehicles, appliances, and other enterprise systems that are equipped with electronics, software, and sensors, where most, if not all, of these items are within a network and share some measure of connectivity which enable these and other pieces of equipment to connect, communicate, and exchange data. This may allow various systems, objects, and items in an enterprise environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc. By creating a "smarter" environment and leveraging interactivity between various pieces of equipment in an enterprise network, the machine and sensor data 105 may provide significant amounts of information and data that can be collected. Together with other technologies and systems described herein, the machine and sensor data 105 may help enable the digital content communications system 100 provide a more efficient way to provide customer or product support.

The geolocation data 106 may include information or data associated with identification or estimation of real-world geographic location of an object, such as a radar source, mobile device, or web-based computer or processing device. Geolocation data 106 may provide specific geographic coordinates or data that may be used for monitoring location, distinct or together with, other various positioning systems or applications. For example, the geolocation data 106 may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data 106 may include other self-disclosing or self-identifying information, including but not limited to country, region county, city, postal/zip code, latitude, longitude, time zone, domain name, connection speed, internet service provider (ISP), language, proxies, or other information that can be used to piece together and trace location. This and other data in the data source layer 101 may be collected, monitored, analyzed, and/or incorporated with user verification and authentication for digital content security and communication.

The enterprise hub 111 may collect, manage, process, and analyze information and data from the data source layer 101 and the applications layer 121. The enterprise hub 111 may be within general control of an enterprise, such as an organizational entity conducting operations, business, or other related activities. The enterprise hub 111 may collect, manage, process, and analyze information and data from the data source layer 101 and the applications layer 121. In order to do this, the enterprise hub 111 may include one or more data stores, one or more servers, and other elements to process data for its organizational purposes. For example, the enterprise hub 111 may include a data management store 112*a*, an operational data store 112*b*, and an enterprise data store 112*c*. The data management store 112*a* may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

The operational data store 112*b* may store information and data associated with operational reporting, controls, and decision-making. The operational data store 112*b* may be designed to integrate data from multiple sources for additional operations on that data, for example, in reporting, controls, and operational decision support. Integration of data at the operational data store 112*b* may involve cleaning, resolving redundancy, checking against business rules, and other data integration techniques, such as data virtualization, federation, and extract, transform, and load (ETL). The operational data store 112*b* may also be a source of data for an enterprise data store 112*c*, which may be used for tactical and strategic decision support.

The enterprise data store 112*c* may store information and data associated with reporting and data analysis, and may be instrumental to various business intelligence functions. For example, the enterprise data store 112*c* may be one or more repositories of integrated data (e.g., from the operational data store 112*b*) and used to store current and historical data and to create analytical report(s) for advanced enterprise knowledge. Data passed through the enterprise data store 112*c* may also involve cleansing to ensure data quality and usage. ETL may also be used, as well as other techniques, involving staging, data integration, and access features. Ultimately, data in the enterprise data store 112*c* may be transformed and catalogued so that it may be used for data mining, analytics, and other business intelligence purposes, such as marketing, decision support, etc. Other data stores may also be provided in the enterprise hub 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The enterprise hub 111 may further include a variety of servers 113*a* and 113*b* that facilitate, coordinate, and manage information and data. For example, the servers 113*a* and 113*b*, as well as others described herein, may include any number or combination of the following servers: exchange servers, content management server, application servers, database servers, directory servers, web servers, security servers, enterprise servers, and analytics servers. Other servers to provide data security and protection may also be provided.

The enterprise hub 111 may also include an analytics system 200. The analytics system 200 may include various layers, processors, systems or subsystems. For example, the analytics system 200 may include a data access interface 202, a processor 203, a data management subsystem 208, a computation management subsystem 214, and an output interface 222. Other layers, processing components, systems or subsystems, or analytics components may also be provided. It should be appreciated that the data management 208 and computation management 214 may be other processing components integrated or distinct from processor 203 to help facilitate data processing by the analytics system 200 as described herein. Features and functionalities may be particularly helpful in data management, predictive analytics, and machine learning.

There may be many examples of hardware that may be used for any of the servers, layers, subsystems, and components of the analytics system 200 or the digital content communications system 100 described herein. For example, the processor 203 may be an integrated circuit, and may execute software or firmware or comprise custom processing circuits, such as an application-specific integrated circuit (ASIC) or field-programmable gate array (FPGA). The data access interface 202 and output interface 221 may be any number of hardware, network, or software interfaces that serves to facilitate communication and exchange of data between any number of or combination of equipment, protocol layers, or applications. For example, the data access interface 202 and output interface 221 may each include a network interface to communicate with other servers, devices, components or network elements via a network in the digital content communications system 100. More detail of the analytics system 200 is provided in FIG. 2.

The digital content communications system 100 may also include an applications layer 121. The applications layer 121 may include any number or combination of systems and applications that interface with users or user-interfacing tools in an enterprise or a personal environment. For example, the applications layer 121 may include statistical analysis applications 122, reporting applications 123, web and mobile applications 124, and enterprise applications 125.

The statistical analysis applications 122 may include systems or applications that specialize in statistical calculations or econometrics. These may include, but not limited to, those by Tableau®, Domo®, Salesforce®, JMP®, MATLAB®, QlikSense®, SPSS®, SAS®, Stata®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The web and mobile applications 124 may include Internet-based or mobile device based systems or applications of various users, namely those in an enterprise environment. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, these enterprise applications 125 may be external or remote to the enterprise hub 111.

It should be appreciated that a layer as described herein may include a platform and at least one application. An application may include software comprised of machine-readable instructions stored on a non-transitory computer readable medium and executable by a processor. The systems, subsystems, and layers shown in FIG. 1 or other figure may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the servers 113a and 113b, and/or other servers within the systems, layers, and subsystems of the digital content communications system 100, as described herein. However, it should be appreciated that multiple servers may be used for each of these servers, and the servers may be connected via one or more networks. Also, middleware (not shown) may include in the digital content communications system 100 as well. The middleware may include software hosted by one or more servers, or it may include a gateway or other related element. Such middleware may be used to enhance data processing, edge-based analytics, or other related operations. Furthermore, it should be appreciated that some of the middleware or servers may or may not be needed to achieve functionality. Other types of servers, middleware, systems, platforms, and applications not shown may also be provided at the back-end to facilitate the features and functionalities of the digital content communications system 100.

The digital content communications system 100, as described herein, may provide several benefits and advantages over conventional techniques. For example, the digital content communications system 100 may reduce complexity of conventional systems that require manual resources or cumbersome coordination of several components or approaches. The digital content communications system described herein may therefore allow an organization entity (e.g., commercial, financial, government, etc.) to engage with users and provide a deeper level of product support using account management and predictive analytics.

For specific applications directed to managing implementation of product support solutions, as described herein, the digital content communications system may provide predictive analysis of likelihood of a customer and/or product being cancelled, deferred, or going live as scheduled. Using this information, the digital content communications system 100 may also determine whether a customer should remain on a regular warranty or require extended warranty. This may be based on a client profile, current status, or other information. Furthermore, the digital content communications system 100 may provide predictive forecasting for duration product phases, such as analysis, design, build, etc. In this way, the digital content communications system may provide a more expedient, less error prone, and more intelligent approach to customer and product support.

The digital content communications system 100 may be platform independent. In other words, online applications associated with the digital content communications system 100 may be used across various platforms, such as Windows, MAC, Unix, or other operating systems. The digital content communications system 100 may also be hosted in the cloud, provisioned/accessed via the web, or provided locally/remotely via on-site premises.

Within the digital content communications system 100, there may be a large amount of data that is exchanged, and the exchanged data may sensitive or personal. With new laws and regulations surrounding sensitive personal data in possession by organizational entities, the digital content communications system 100 described herein may also provide a more robust approach to handle and process potentially sensitive personal data, as is required.

The General Data Protection Regulation (GDPR), for example, is a new regulation recently passed by the European Parliament (EP), the Counsel of the European Union (EU), and the European Commission (EC) in order to strengthen and unify data protection for individuals within the EU. The GDPR specifically addresses the export of personal data outside of the EU and aims to give control back to citizens and residents over their personal data, as well as to simplify the regulatory environment for international business. These and other new laws are having an impact to companies, organizations, and entities that are entrusted or in possession of private or personal data. In order to comply with these new laws and regulations, such as the GDPR, organizational entities may need to understand what data and information they possess, why they possess it, and the potential sensitivity of that that data. The digital content communications system 100, as described herein, may therefore provide a more dynamic and scientific approach to provide monitoring, diagnostics, and analytics to using and processing such potential sensitive data in an enterprise network.

Ultimately, the digital content communications system 100 may allow an organization entity (e.g., commercial, financial, government, etc.) to engage with users and provide a deeper level of product support using account management and predictive analytics and provide a more expedient, less error prone, and more intelligent approach to overall customer and product support.

Figure 2:
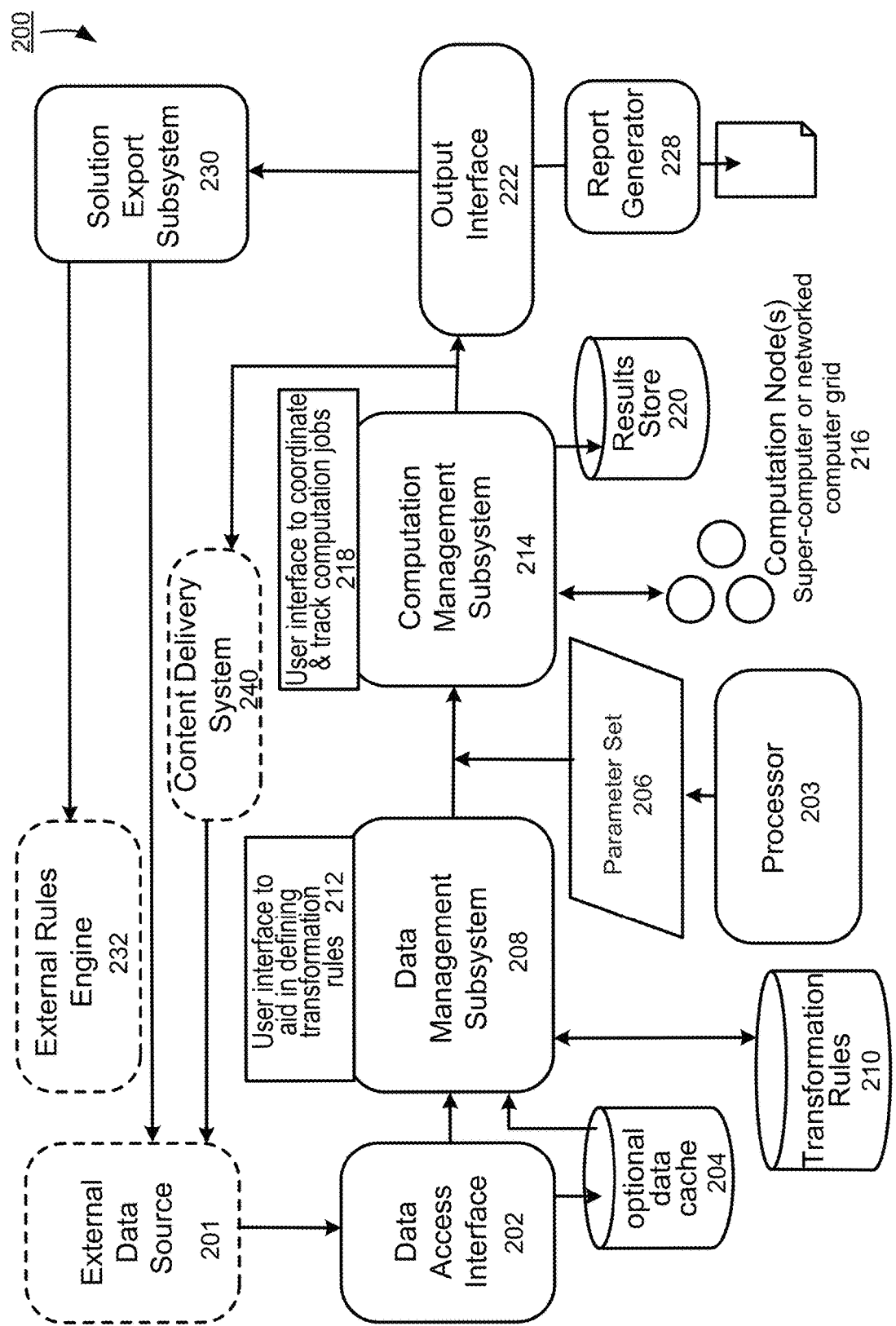
FIG. 2 illustrates an example of components in an analytics system, according to an example.

FIG. 2 illustrates an example of components in the analytics system 200, according to an example. Although the analytics system 200 shown in FIG. 2 is depicted in an integrated manner, it should be appreciated that the analytics system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the analytics system 200 may provide customer or product support using account management and predictive analytics. In an example, the analytics system 200 may be an integrated system as part of the enterprise hub 111 shown in FIG. 1.

In the example of FIG. 2, data may be accessed from an external data source 201 by a data access interface 202. The external data source 201 may be any data source from the data source layer 101, enterprise hub 111, and applications layer 121 of the digital content communications system 100 of FIG. 1, as well as other data sources not depicted. The data access interface 202 may optionally store some or all (or none) of the data in an optional data cache 204, which may be local or remote. The imported data may then be passed to a data management subsystem 208 for processing prior to performing analytics. For example, the data management subsystem 208 may organize the data by grouping, ordering, transforming, or cleaning the data in such a way that facilitates input of the data into analytics processing. The data management subsystem 208 may use one or more transformation rules that specify one or more rules to apply to the data for processing. In an example, the transformation rules may be accessed from storage (e.g., from data store 210). Additionally or alternatively, the transformation rules may be input by a user. For example, the data management subsystem 208 may provide a user interface 212 to a user that enables the user to specify one or more transformation rules. The data management subsystem 208 may also implement data management without rules (e.g., non-rule-based) and rely on other data management schemes.

The data management subsystem 208 may identify different types of variables that are specified by the user, and separate the variables according to the identified type. Some types of variables may be used as inputs to the analytics process, while other types of variables may be used evaluation criteria to evaluate the resulting analytics solutions. As such, the system may enable not only automated processing of data, but also automated evaluation of the resulting analytics solutions.

In an example involving clustering, the analytics system 200 may separate variables in the data across three distinct types: Target Drivers, Cluster Candidates, and Profile Variables. Target Drivers may be factors that are for driving the success of a business, such as revenue, profitability, potential value of a customer, costs, etc. In some cases, there may be no more than two or three target drivers. Cluster Candidates may be attributes that are readily available that may be used to partition the overall population. These may describe the population and may be significantly different from the business drivers. Profile Variables may be other factors that are not assigned as cluster candidates or target drivers. Profile variables may not be immediately actionable (the data may not be easily accessible or may be found only after a period of time) or they may be too much of a restatement of the business drivers.

The variables determined by the data management subsystem 208 and a parameter set 206 generated by the processor 203 may be provided to the computation management subsystem 214. The computation management subsystem 214 may send the processed data including the parameter set 206 and one or more chosen clustering algorithms to one or more computational nodes 216 to perform clustering operations. The clustering operations may identify several (e.g., thousands or millions) different cluster solutions, each including a plurality of clusters of the data.

The computation management subsystem 214 may evaluate generated cluster solutions based on user-specified criteria, and iterate through multiple sets of cluster solutions to identify cluster solutions that satisfy the criteria. The computation management subsystem 214 may identify also apply one or more generalized heuristic supervised learning algorithms to the computation process to improve the efficiency of the solution search, based on the cluster solutions generated by the computational nodes 216. The supervised learning algorithms may utilize target driver variables specified by the user to facilitate searching for particular cluster solution(s), among the potentially many cluster solutions generated by the computation nodes 216, that are meaningful to the user. The computation management subsystem 214 may also provide a user interface 218 that shows the user the progress of the clustering and shows cluster solutions.

The computation management subsystem 214 may also provide a user interface 212 that shows the user the progress of the clustering and shows cluster solutions. The user interface may be an output interface 222, like that shown in FIG. 1, which may in turn include a visualization interface that may show cluster solution(s) and other information pertaining to the cluster solutions. A report generator 228 may generate report regarding the cluster solutions.

In some implementations, the visualization interface may also provide the cluster solution(s) and/or evaluation results to a solution export subsystem 230. The solution export subsystem 230 may provide feedback information to the analytics system 200 or other systems in the digital content communications system 100. For example, the solution export subsystem 230 may provide feedback information to an external rules engine 232 (or other feedback component), which may, for instance, use the feedback information to adapt one or more transformation rules. Additionally or alternatively, the solution export subsystem 230 may feedback information to the external data source 201, for instance, to adjust one or more variables or attributes in the data. In this way, the analytics system may be fine-tuned to provide improved and more accurate calculations and computations.

For example, the solution export subsystem 230 may be configured to export information regarding a cluster solution to different types of external databases and external systems, and facilitate the implementation of the cluster solution by the external systems. In some implementations, the solution export subsystem 230 may be configured to export one or more rules or algorithms for clustering data, based on the cluster solution that was generated. The rules or algorithms may enable external systems to apply those rules or algorithms to implement the generated cluster solution to various types of data stored on the external database. In some implementations, the system may obtain data from the external system, retune the cluster solution based on the received data (such as changing variable selection), and send information regarding a revised cluster solution to the external system. As such, in some implementations, the analytics system 200 may enable more than just an analytics tool, but also enable a feedback-based and connected enterprise system.

The output interface 222 may include a visualization interface that provides the resulting cluster solution(s) and results of the evaluation to a report generator 228, which may generate a report to be output to the user, such as a security manager or other user. The report may include various types of information regarding the evaluation of the cluster solution(s) or other calculation, and may enable a user to adjust one or more variables of the analytics system 200 to fine-tune the clustering operations.

As a commercial example, for a data set of 10,000 customers with voluminous data (e.g., from a customer survey or customer search histories), the analytics system 200 may select some subset of variables from that data set (e.g. 5 variables) and generate a cluster solution that divides those 10,000 customers into 4 different groups. For example, cluster A may include "high-value" (or "low-risk") customers that generate a majority of the company's profits, such that the company may want to ensure maintaining its marketing budget for those customers; cluster B may include "moderate-value" (or "medium-risk") customers; cluster C may include "low-value" (or "high-risk") customers that generate very little profits and may even cost the company money; and cluster D may include "prospective" (or new targets) customers that represent opportunity for new sales, such that the company may want to market to them more aggressively.

Now consider a scenario in which, after those 10,000 customers have been assigned to four clusters, the company wants to organize and cluster another 1 million customers into the four cluster groups. The analytics system 200 may be configured to export a solution, e.g., as a basic algorithm, that the company's computer systems may be able to use to assign new customer records to the four cluster groups. As illustrative examples, the exported solution may be in the form of a special SQL function that can be processed by the company's customer database, or a Hadoop Map-Reduce algorithm that can similarly be processed on the company's BigData Hadoop cluster, etc. In some implementations, the exported solution may enable the company to implement the cluster solution in a manner that is independent of system that generated the cluster solution, such that the company can easily implement the cluster solution locally within its own systems. In some implementations, the exported solution may only need as input the selected subset of variables (e.g., 5 variables in the example above) that were used in the cluster solution computation.

By providing a composite technique of cluster generation and cluster evaluation, the analytics system 200 may enable the user to analyze the details and nuances of many (e.g., dozens of) solutions at the same time, rather than individually analyzing one solution at a time to see if each solution is appropriate. The analytics system 200 may therefore enable a user to explore a large number (e.g., millions) of cluster solutions efficiently in less time than it would take a typical practitioner to evaluate fewer (e.g., a couple dozen) cluster solutions.

In an example, the analytics system 200 may also include an external system, such as content delivery system 240, that may be controlled based on a selected cluster solution. For example, instructions may be sent to the content delivery system 240 based on attributes determined for clusters in the selected cluster solution. In an example, attributes may be identified for a cluster that are associated with customers shopping with coupons, which may indicate that a shopping pattern associated with coupons exists that is particular to shoppers from a particular geographic location, such as a north west region. The computation management subsystem 214 or another subsystem or layer not shown may send instructions to the content delivery system 240 to digitally send electronic coupons over a network to customers in the north west region. In an example, the content delivery system 240 may include a contact resource management system, such as provided by Salesforce.com®, Infusionsoft®, Microsoft Dynamics®, etc., which automatically targets customers. For example, data in a database that is associated with customers in the north region may be queried and for each customer customized emails or coupons are automatically sent. The content delivery system 240 may have the flexibility to send emails and coupons with a time-interval of hours, days, weeks, etc. and also has an option to trigger sending through the instructions. The external data source 201 may capture online behaviors of the targeted customers to determine whether the coupons are being used for purchases and to provide feedback for future clustering.

In some implementations, the user interfaces 212, 218, including the output interface 222, may be custom-designed user interfaces that facilitate some portion of the overall activity and, in some cases, may be used by multiple users with different roles. As such, the analytics system 200 may coordinate and facilitate a distributed process of cluster generation and evaluation, and streamline the tasks and roles that potentially involve the participation of multiple people.

It should be appreciated that while clustering is described in a corporate marketing example, other various techniques and/or implementations may also be provided. For example, the analytics system 200 may be used to provide modeling, simulation, predictive analytics, use of knowledge graphs, as well as various other statistical or data-driven approaches. In the present application, the analytics system 200 may be used to provide digital content communication using account management and predictive analytics in customer and product support environments. These may include several specific scenarios as well, such as (i) cancel/defer/go live, (ii) regular-extended warranty, and (iii) phase duration forecasting, all of which will be described in more detail herein. The analytics system 200 may monitor and analyze data exchanged in an enterprise network in order to provide customer or product support, all the while minimizing risk to an organization entity, reducing cumbersome processes, and enhancing efficiency for both an organization and its clients.

Figure 3:
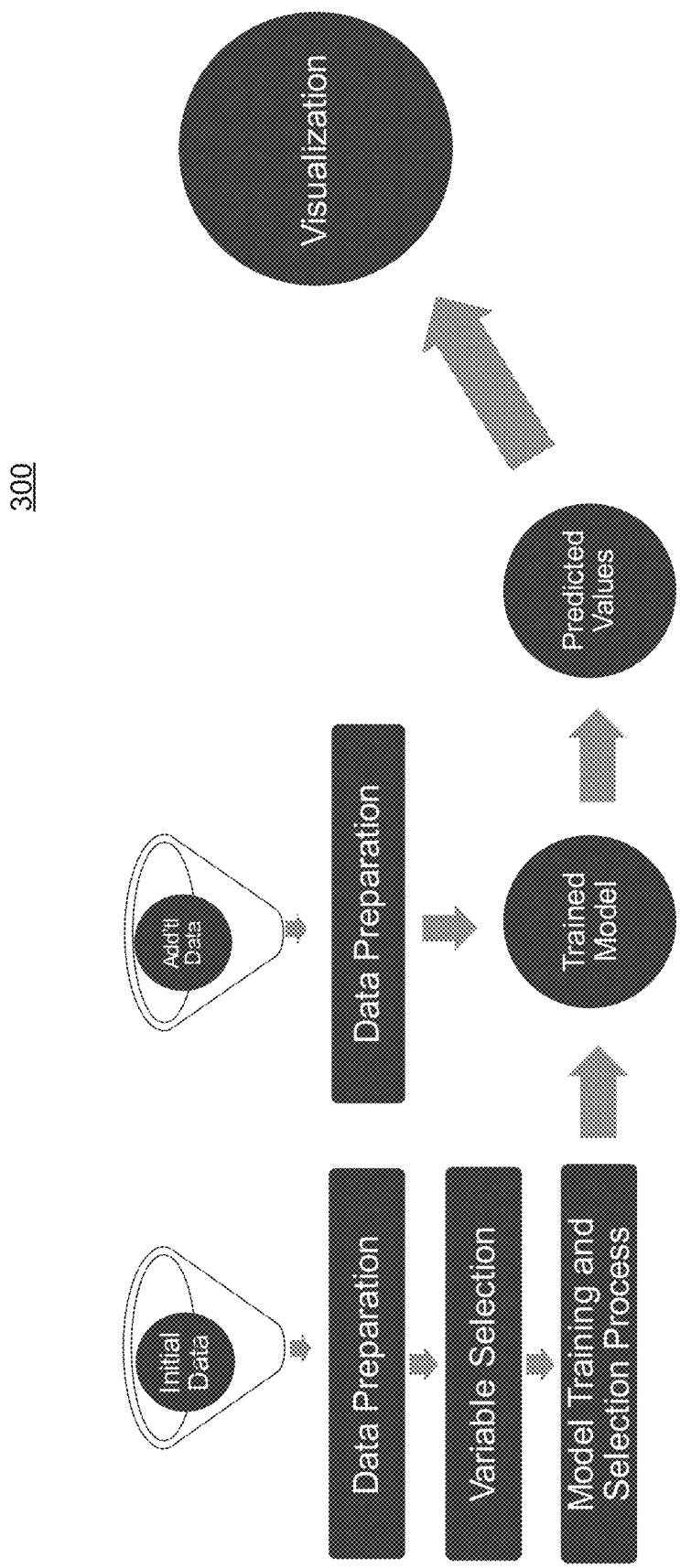
FIG. 3 illustrates a data flow for a digital content communications system for account management and predictive analytics, according to an example.

FIG. 3 illustrates a data flow 300 for a digital content communications system for account management and predictive analytics, according to an example. As shown, initial data may be collected and acquired from any number of data sources, such as those shown in FIG. 1. Once collected, the data may be prepared for variable selection. A model and selection process may be determined. The model may then be trained using the initial set of data and selected parameters. It should be appreciated that additional data may be collected and acquired (and prepared) to help train the model or simply be run through the trained model to provide predicted values. These predictions may then be presented via an output, usually in some form of visualization for an end user.

It should be appreciated that data preparation may be an important step in the data flow 300. For example, in the context and scenarios described herein, two to three years worth of data may be acquired and collected from a customer base of a company seeking to determine whether a customer will cancel, defer, or go live according to schedule for a given product. With this quantity of information, variables associated with the data may include: Client Name, Expected Go Live, Date (categorized # of months), Client's driving business factors, Cancel-Defer-On Time status for go live, Mobile App (Y/N/M), Client's HOT factors, Regular-Extended status for warranty, Billing Special Deal (Y/N), WFR Requests, Modules purchased, Current Timekeeping System, Future Expansion?, Start and end dates for each phase, Current HR System, Module Status, Client State, Current Payroll System, PM EID, Client Country, Interface Setup, AC EID, Size of Business (# of employees), Migration History (Y/N), Assignment Type, Industry, Training (Y/N), Support Duration, Project Type, TLM Awareness, etc.

In data preparation, an imputation of missing values may be provided. In other words, the digital content communications system 100 may use "predictive mean matching," which may be a technique for filling in missing values with an existing value from another record. Also, oversampling of training data may be provided. For classification models, data may "unbalanced" (e.g., records went live, 6 records deferred, and 1 record cancelled). This may be not ideal. Therefore, in order to balance out the training data, a Synthetic Minority Over-sampling Technique (SMOTE) may be used to create "synthetic data points" for the underrepresented outcomes. After data is prepared, variable selection may be the next action.

Figure 4:
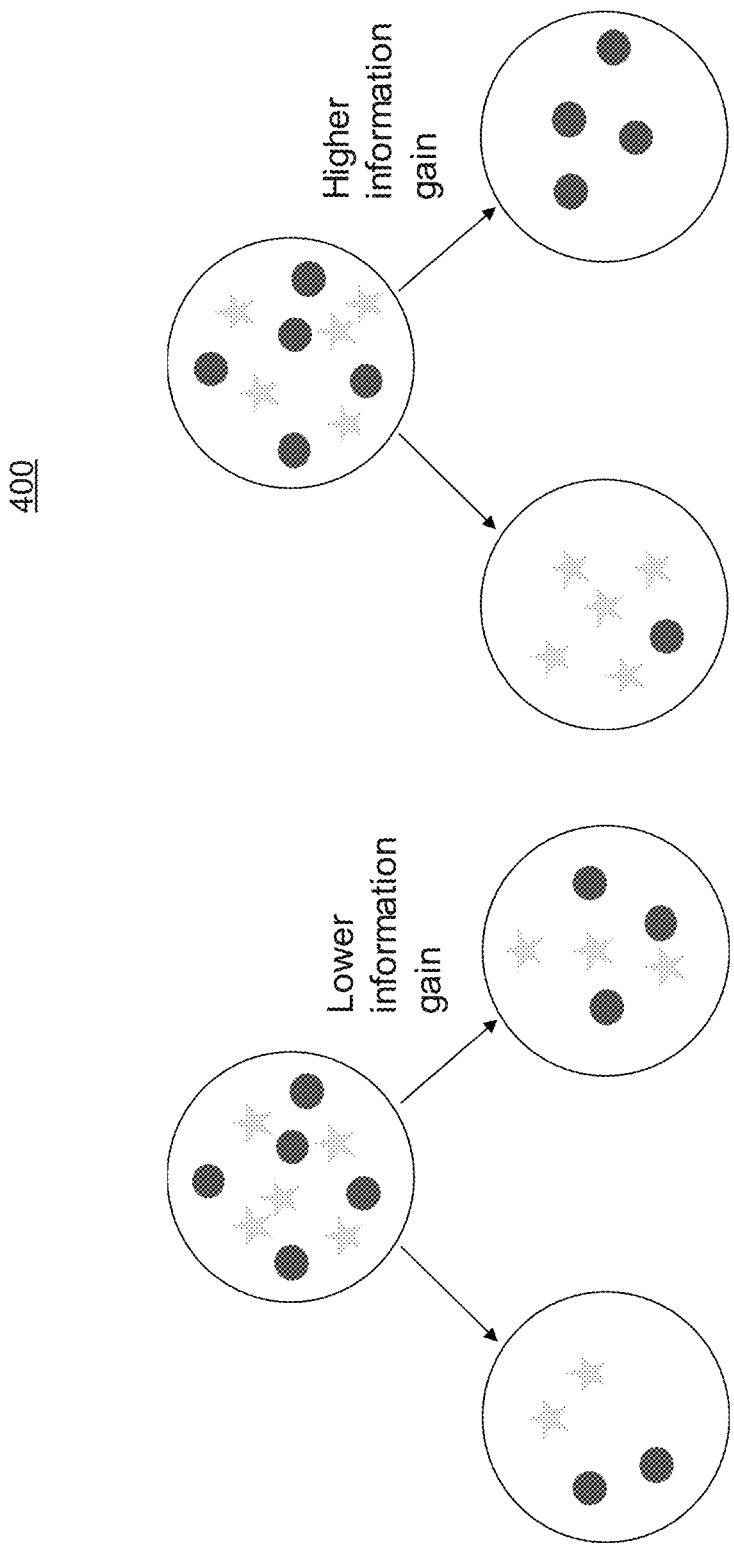
FIG. 4 illustrates a diagram for variable selection in a digital content communications system for account management and predictive analytics, according to an example.

FIG. 4 illustrates a diagram 400 for variable selection in a digital content communications system for account management and predictive analytics, according to an example. As shown, information gain may be used to pre-select which variables to use in a predictive model. Information gain may represent a decrease in entropy/variation in the resulting branches when the dataset is split on a variable. In this example, high information gain, may help better organize or categorize data where it belongs for the purposes of modeling. For instance, a splitting variable with higher information gain (e.g., additional information provided by the variable) may result in a different (or better) classification. As a result, the resulting classes may be purer (e.g., being composed of mainly red balls or yellow stars).

Figure 5:
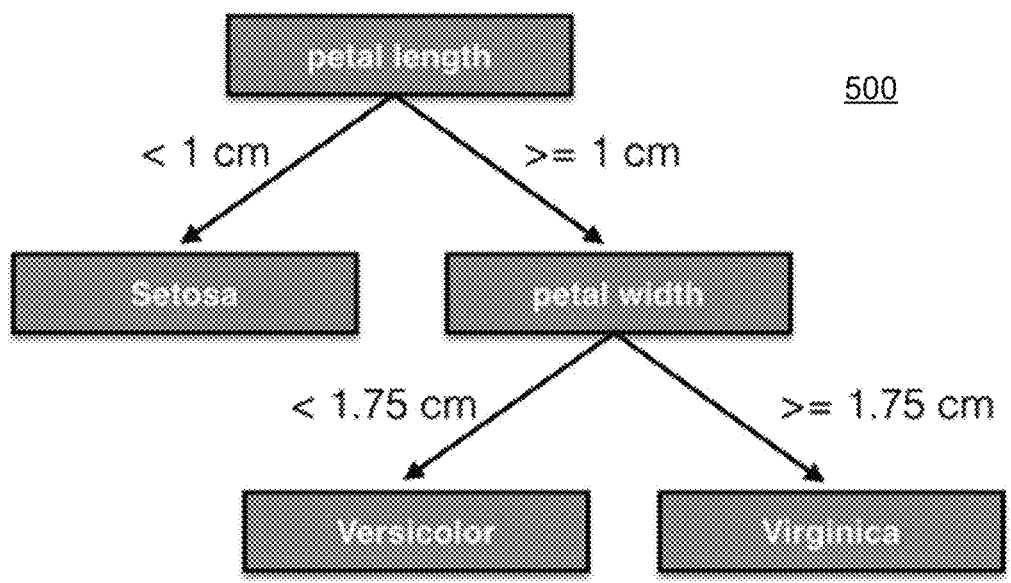
FIG. 5 illustrates a diagram for random forest model in a digital content communications system for account management and predictive analytics, according to an example.
Figure 5:
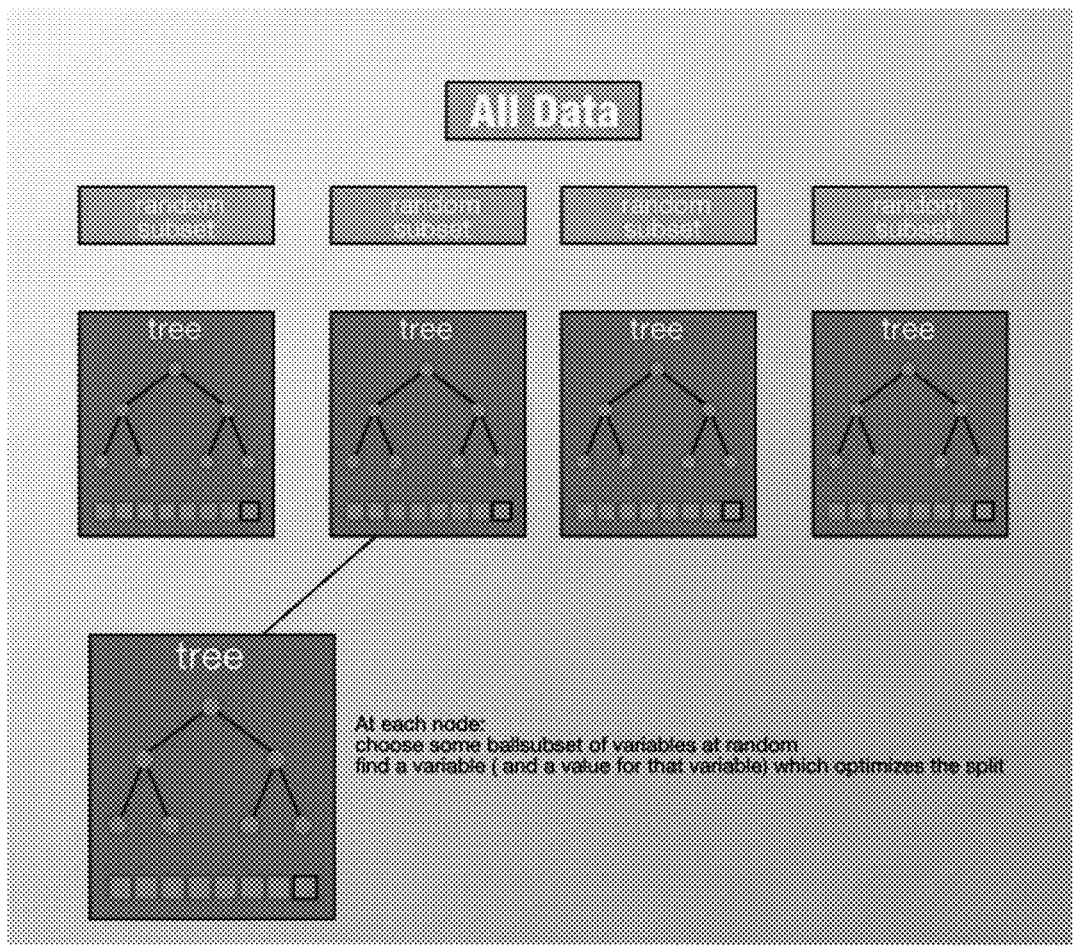

FIG. 5 illustrates a diagram 500 for random forest model in a digital content communications system for account management and predictive analytics, according to an example. As described herein, the digital content communications system 100 may be used to help determine whether a product solution will be cancelled, deferred, or going live as scheduled. As shown, a random forest model with 2500 trees (e.g., using R (mlr package)) may be used to help predict if the client cancels, defers, or goes live on time. Here, each decision tree may be generated with a subset of the data and the final prediction may be based on the majority vote of all the trees. In each decision tree, a series of rules may be generated to split the data into sections based on the predictors. The predicted outcome may also be based on the most common outcome in each group.

In an example, 9 variables that impact go-live/defer/cancel of client may be identified. These may include: Industry, Project Type, Driving Business Factor: Automation, When does client expect to go live?, Assignment Type, Use of mobile app, HOT point: Interface, Country, and Module Scope. A trained model on 157 observations (100% of data), for example, using 59 observations before oversampling may provide results. It should be appreciated that 100% of data used for training as the dataset may be relatively small or unbalanced since one event of interest may only have one occurrence. That said, a sample outcome for the trained model may be as follows:

| Outcome | Number of Records |
| --- | --- |
| Cancelled | 1 |
| Deferred | 6 |
| Live | 52 |
| New (no outcome) | 57 |

Based on a 10-fold cross validation, a same prediction accuracy for cancel-defer-go live may be determined to be 88.5%, or as shown below.

| Statistics | Formula | Cancel | Defer | Live |
| --- | --- | --- | --- | --- |
| Precision | True positive/(True positive + False positive) | 0.98 | 0.82 | 0.86 |
| Recall | True positive/(True positive + False negative) | 0.96 | 0.87 | 0.83 |

It should be appreciated that a random forest may include an ensemble of various decision trees. While individual decision trees may be weak learners, their ensemble (if these trees are not correlated) may be a strong learner, providing a more reliable classification. In other words, for any given decision tree, inputs entered at the top may get bucketed into smaller and smaller sets as these traverses down the tree, as shown.

Figure 6:
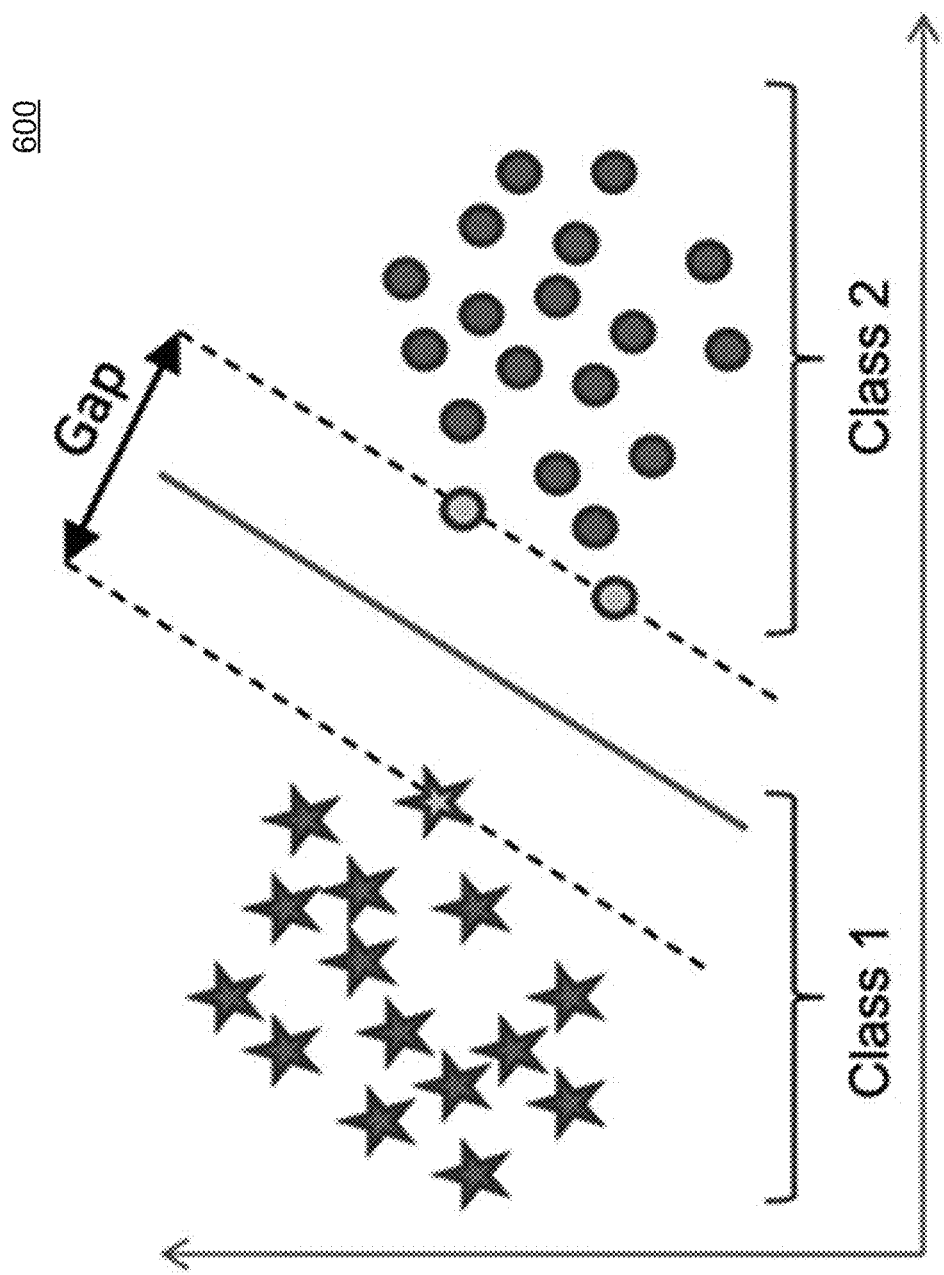
FIG. 6 illustrates a diagram for support vector machine (SVM) in a digital content communications system for account management and predictive analytics, according to an example.

FIG. 6 illustrates a diagram 600 for support vector machine (SVM) in a digital content communications system for account management and predictive analytics, according to an example. In an example, the digital content communications system 100 may be used to help determine whether a customer will likely need regular warranty or extended warranty. Here, a support vector machine (SVM) technique may be used to build a model, for example, using R (e1071 package). As shown, the SVM may classify data points into two categories by finding the line (hyperplane) that best separates them. The so-called support vectors may be represented by points on dotted line that are nearest to a hyperplane. It should be appreciated that moving these points elsewhere may change the dividing hyperplane. Accordingly, they may be the most critical elements of such a data set.

In an example, using a similar approach as described above for cancel/defer/go live, 7 variables that impact regular/extended warranty of client may be identified. These may include: Number of business days, Driving Business Factor: Automation, Use of mobile app, Size of business, HOT point: Payroll-based Journal, Industry, and HOT point: Others. A trained model on 87 observations (100% of data), for example, using 56 observations before oversampling may provide results as follows:

| Outcome | Number of Records |
| --- | --- |
| Regular | 13 |
| Extended | 43 |

Based on a 10-fold cross validation, a same prediction accuracy for regular-extended may be determined to be 84.8%, or as shown below.

| Statistics | Formula | Extended |
|---|---|---|
| Precision | True positive/(True positive + False positive) | 0.90 |
| Recall | True positive/(True positive + False negative) | 1.00 |

As shown, the SVM may identify a hyperplane that optimally separates classes from each other, all of which may be helpful in determining whether a customer will likely need regular warranty or extended warranty.

Figure 7A:
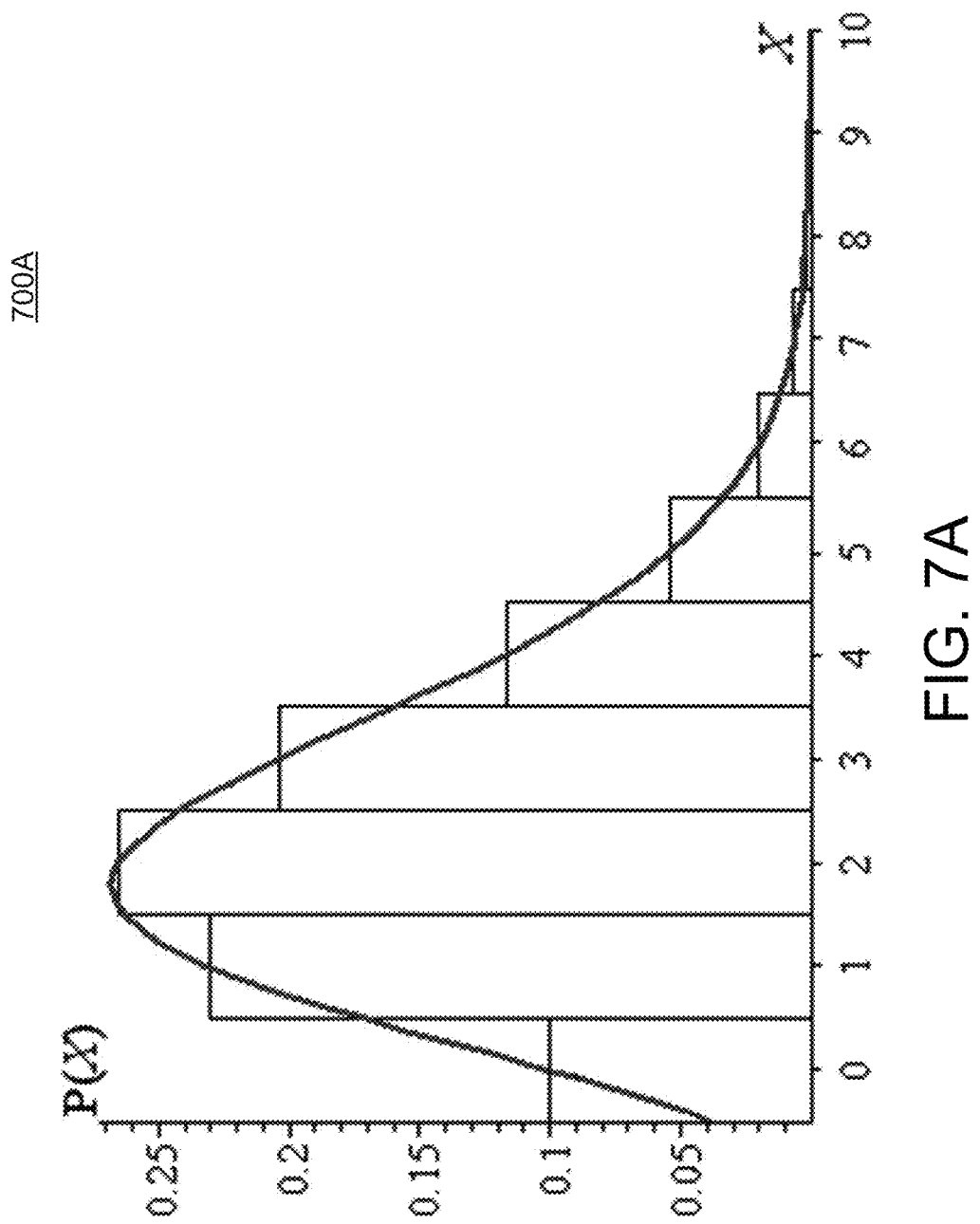

FIG. 7A-7B illustrate diagrams for phase duration forecasting in a digital content communications system for account management and predictive analytics, according to an example. Here, how long (in days) each phase for product solution/support will last may be predicted. Specifically, in one example, there may be 5 Poisson models and 1 SVM model used for all phases (Design, Build, Test, UAT, Deploy, Support). It should be appreciated that a Poisson regression may be used to predict probabilities that the duration of certain phase will occur, i.e. design, build, test, etc., and a Support Vector Machines (SVM) may be used to forecast the Deploy phase because there may be only two possible values, <1 or 1 day. Other various techniques may also be used or provided. FIG. 7A illustrates a diagram 700A for a Poisson regression, according to an example. As shown, the Poisson regression may be used to predict a dependent variable that consists of count data given one or more independent variables.

FIG. 7B illustrates a diagram 700B for a chart indicating how many days a phase may last, according to an example. In an example, 4 variables may be identified in forecasting the phase duration and the Pseudo $R^2$ (accuracy) may also be shown. In FIG. 7B, the table illustrates various performing algorithms for the different models built, together with the significant predictor variables and a measure (pseudo r2) of how well the models perform.

It should be appreciated that Pseudo $R^2$ may be generally associated with a regression model ranging from 0 to 1 with higher values indicating better predictive performance, as shown below.

| Measure | Design | Build | Test | UAT | Support |
|---|---|---|---|---|---|
| Pseudo $R^2$ | 0.95 | 0.56 | 0.81 | 0.96 | 0.67 |

SVM prediction accuracy (based on a 10-fold cross-validation) may be 93.9%

| Measure | Formula | Deploy |
|---|---|---|
| Precision | True positive/(True positive + False positive) | 0.93 |
| Recall | True positive/(True positive + False negative) | 1.00 |

Figure 8A:
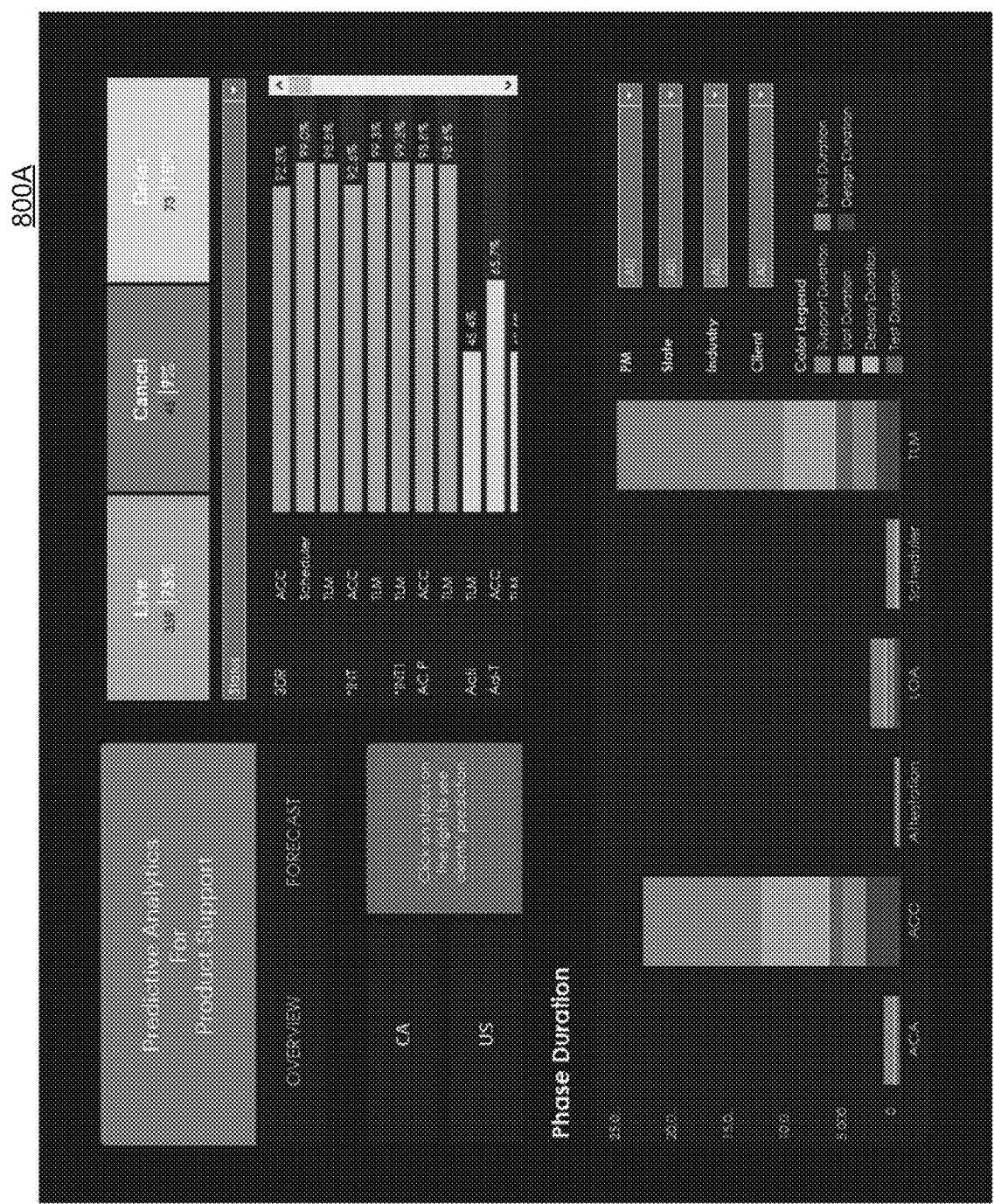
FIGS. 8A-8C illustrate screens for a digital content communications system for account management and predictive analytics, according to an example.
Figure 8B:
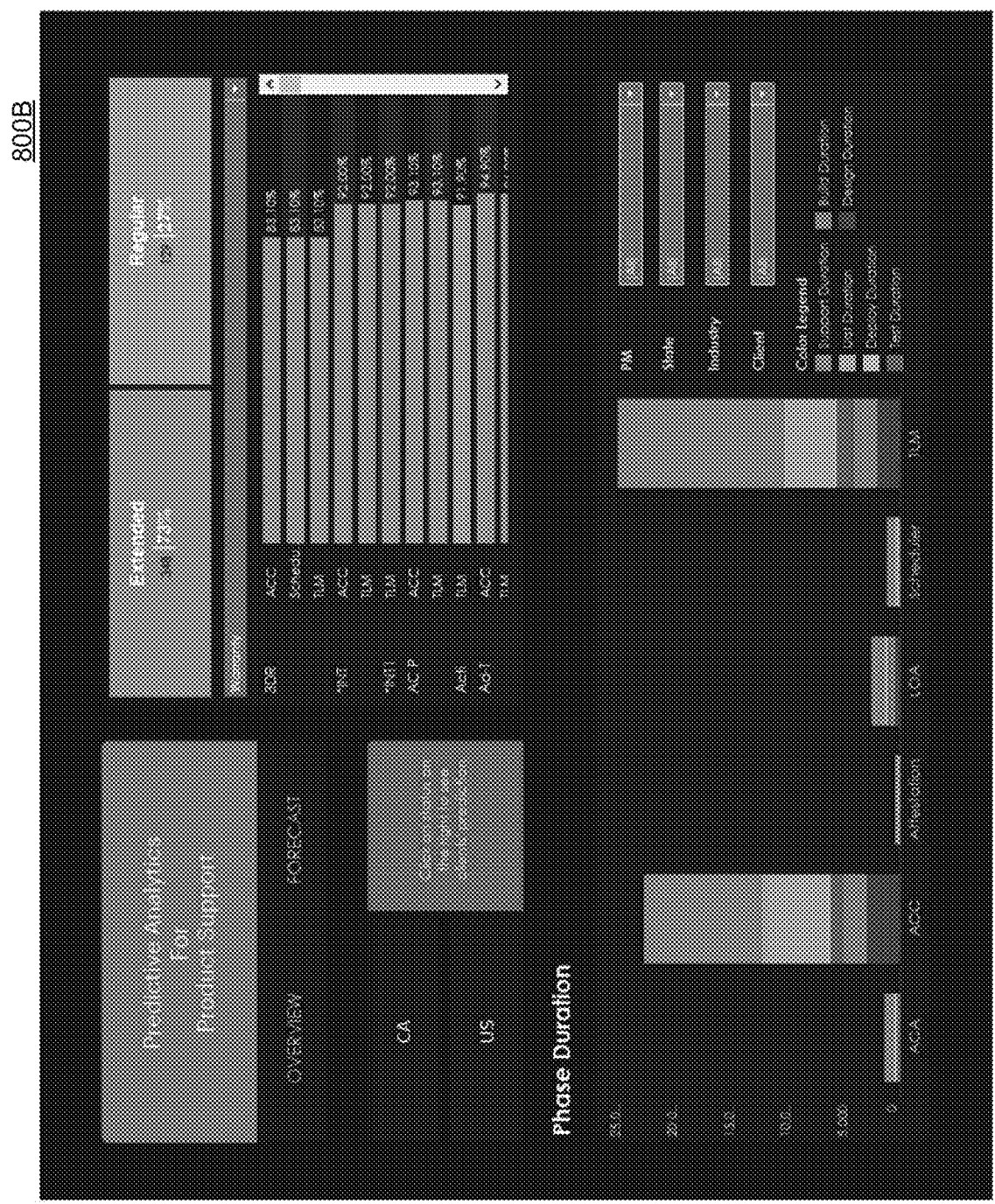
Figure 8C:
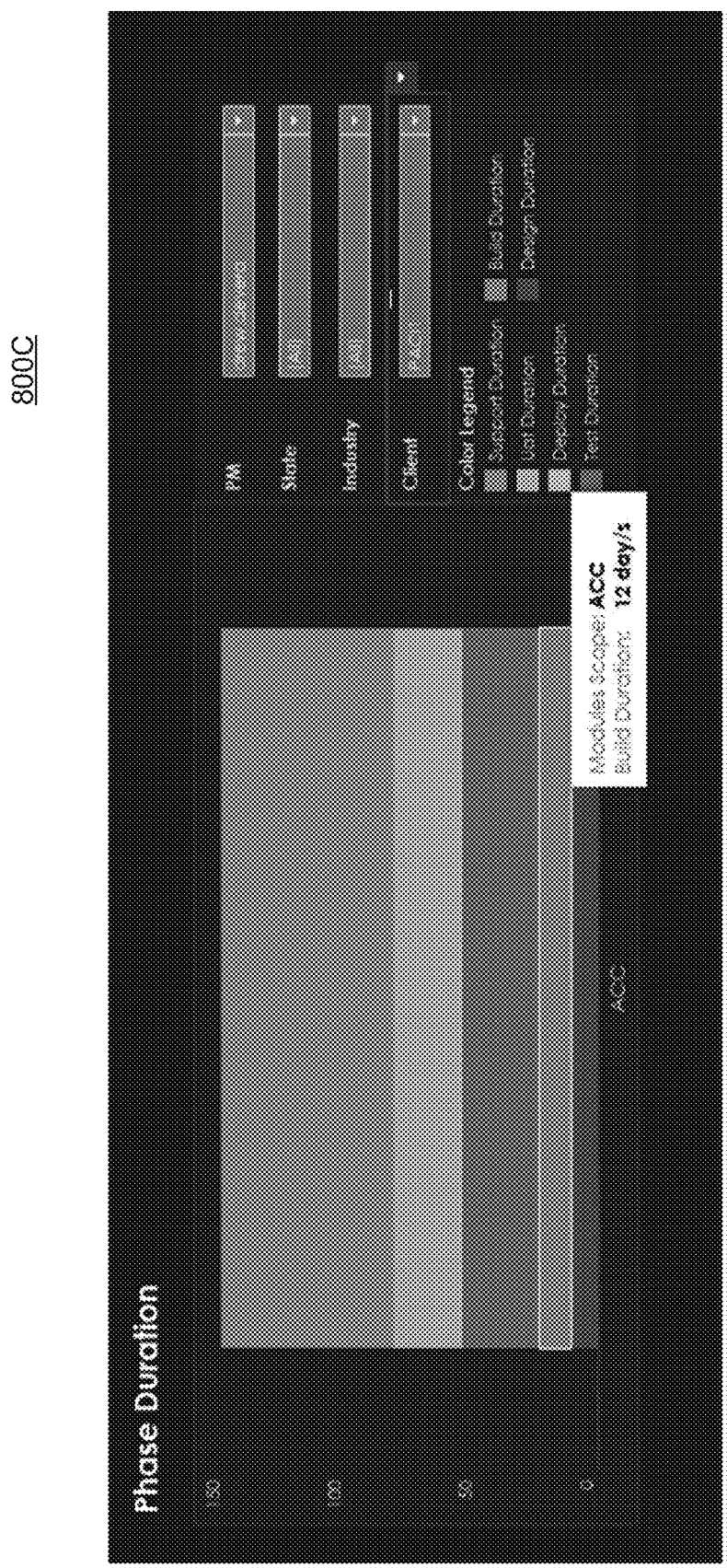

FIGS. 8A-8C illustrate screens 800A-800O for a digital content communications system for account management and predictive analytics, according to an example. In screen 800A, a visualization for cancel-defer-go live model may be shown. Here, accounts that will likely go live on target schedule, cancel implementation, or defer to a later go live data may be shown. More specifically, in FIG. 8A, a variety of items may be shown, for example, how many (and corresponding percentage) of client will most likely "go live" as scheduled, how many will mostly likely cancel, and how many will most likely defer. Screen 800A may also show which clients will go live, which ones will cancel, and which ones will defer, together with the probabilities of going live, etc. The bottom of screen 800A may show a predicted number of days per module for each phase based on the designated color legend.

In screen 800B, a visualization for regular-extended warranty model may be shown. Here, accounts that will likely require warranty extension or accounts that will be on a regularly schedule warranty support may be shown. In screen 800C, a visualization for phase duration forecasting model may be shown. Here, duration of each of the phases of product solution implementation may be shown. More specifically, in FIG. 8B, a variety of items may be shown, for example, how many (and corresponding percentage) of the clients will most likely will have regular warranty (post go-live support) period duration and will likely to have an extend warranty period. Screen 800A may also show which clients will likely to have a regular warranty period or an extended one.

Figure 9:
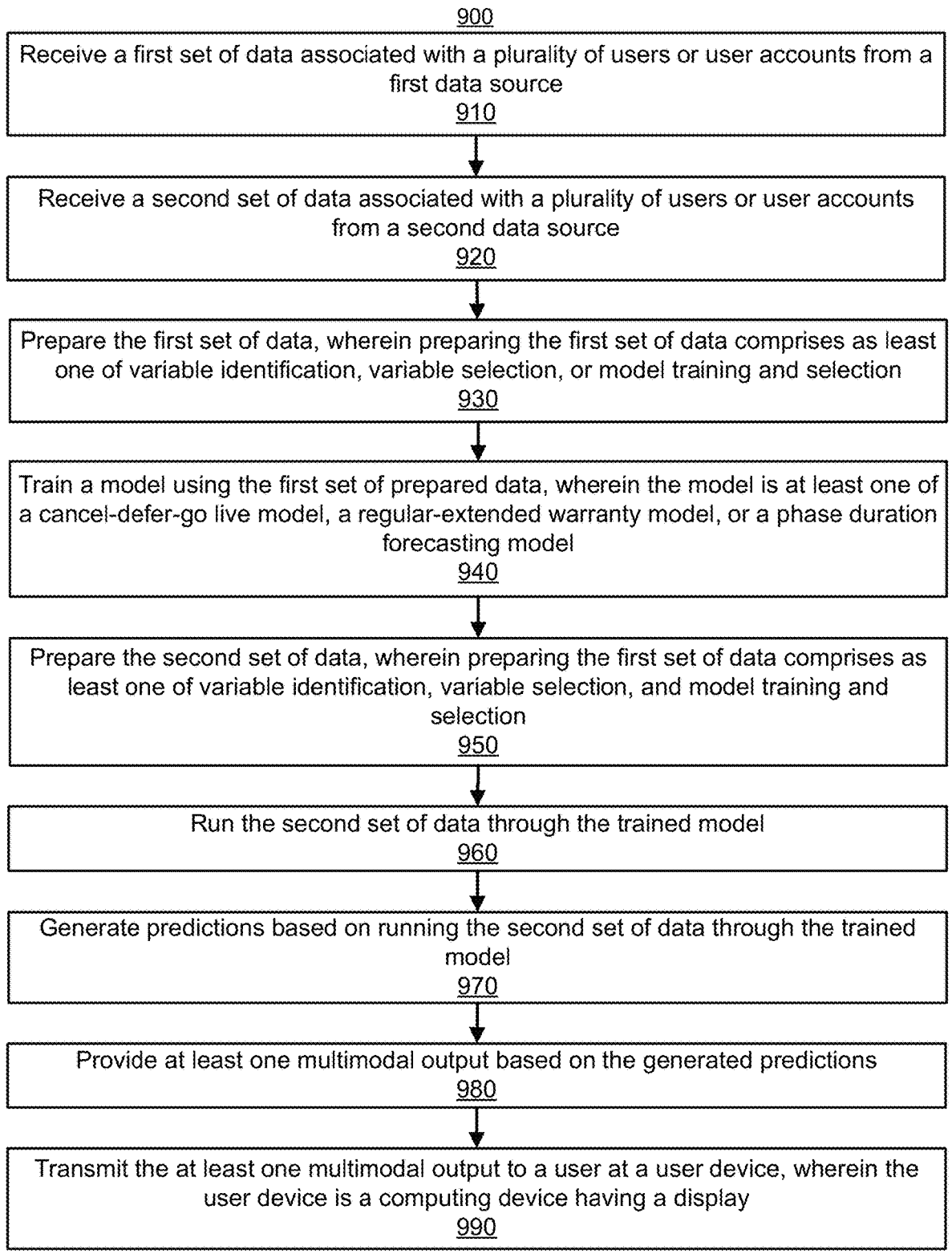
FIG. 9 illustrates a method for digital content communications system for account management and predictive analytics, according to an example.

FIG. 9 illustrates a method 900 for digital content communications system for account management and predictive analytics, according to an example. The method 900 is provided by way of example, as there may be a variety of ways to carry out the method described herein. Although the method 900 is primarily described as being performed by systems 100 and 200 as shown in FIGS. 1 and 2, respectively, and data according to data flow 300 of FIG. 3, the method 9 may be executed or otherwise performed by other systems, or a combination of systems. Each block shown in FIG. 9 may further represent one or more processes, methods, or subroutines, and one or more of the blocks may include machine-readable instructions stored on a non-transitory computer readable medium and executed by a processor or other type of processing circuit to perform one or more operations described herein.

At block 910, a processor may receive a first set of data associated with a plurality of users or user accounts from a first data source. At block 920, the processor may receive a second set of data associated with a plurality of users or user accounts from a second data source. It should be appreciated that, as described above, the first data source and the second data source may each include a website, a document, enterprise resource planning (ERP) system, a database, a web feed, a sensor, a geolocation data source, a server, an analytics tool, a mobile device, a reporting system, or any other data source.

At block 930, the processor may prepare the first set of data, wherein preparing the first set of data comprises as least one of variable identification, variable selection, or model training and selection.

At block 940, the processor may train a model using the first set of prepared data, wherein the model is at least one of a cancel-defer-go live model, a regular-extended warranty model, or a phase duration forecasting model. In some examples, the cancel-defer-go live model may be based on a random forest tree or other model as described above. In some examples, the regular-extended warranty model may be based on a support vector machine (SVM) or some other model as described herein. In some examples, the phase duration forecasting model may be based on a Poisson model, a support vector machine (SVM), or other model. As described herein, the Poisson model may apply a Poisson regression to predict a dependent variable that consists of count data given one or more independent variables.

At block 950, the processor may prepare the second set of data, wherein preparing the first set of data comprises as least one of variable identification, variable selection, and model training and selection.

At block 960, the processor may run the second set of data through the trained model. At block 970, the processor may generate predictions based on running the second set of data through the trained model.

At block 980, the processor may provide at least one multimodal output based on the generated predictions. In some examples, the multimodal output may include a visualization of the generated predictions.

At block 990, the processor may transmit the at least one multimodal output to a user at a user device, wherein the user device is a computing device having a display The advantages of the digital content communications system may be readily apparent, but may include other benefits not described herein. According to examples described herein, an analytics-based support management platform may be provided predictive modeling and account management intelligence to enhance digital content communication. For specific applications directed to managing implementation of product support solutions, the digital content communications system may provide predictive analysis of likelihood of accounts being cancelled, deferred, or going live as scheduled, likelihood of a customer remaining on a regular warranty or requiring extended warranty, and/or predictive forecasting for duration product phases, such as analysis, design, build, etc. Ultimately, the digital content communications system described herein may therefore allow an organization entity (e.g., commercial, financial, government, etc.) to engage with users and provide a deeper level of product support that is more expedient, less error prone, and more intelligent approach to traditional customer and product support techniques.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A digital content communications system, comprising:
one or more data stores to store and manage data within a network;
one or more servers to facilitate operations using information from the one or more data stores;
an analytics subsystem that communicates with the one or more servers and the one or more data stores in the network to provide customer support with predictive analytics, the analytics subsystem system comprising:
a data access interface to:
receive a first set of data associated with a plurality of users or user accounts from a first data source;
receive a second set of data associated with a plurality of users or user accounts from a second data source;
a processor to:
prepare the first set of data, wherein preparing the first set of data comprises variable identification, variable selection, model training, and model selection, wherein the variable selection includes selecting variables that represent a decrease in entropy in resulting branches during dataset splits;
train at least one model using the first set of prepared data,
wherein the at least one model includes a phase duration forecasting model predicting a duration of each phase of a plurality of product support phases,
wherein the phase duration forecasting model is based on a plurality of Poisson models and a support vector machine (SVM) model,
wherein each of the plurality of Poisson models and the SVM model predicts the duration of one of the plurality of product support phases,
wherein
each trained Poisson model predicts a duration of a corresponding one of the plurality of product support phases including count data that is predicted by applying a Poisson regression given one or more independent variables, and
wherein the trained SVM model generates binary-valued duration predictions for a corresponding another one of the plurality of product support phases;
prepare the second set of data, wherein preparing the second set of data comprises variable identification, variable selection, model training, and model selection;
run the second set of data through the trained model;
generate predictions based on running the second set of data through the trained at least one model wherein the predictions from the phase duration forecasting model include predictions for the corresponding product support phase duration of each of the plurality of Poisson models and the SVM model; and
provide at least one multimodal output based on the generated predictions; and
an output interface to transmit the at least one multimodal output to a user at a user device, wherein the user device is a computing device having a display.

2. The system of claim 1, wherein the first data source and the second data source each comprise at least one of a website, a document, enterprise resource planning (ERP) system, a database, a web feed, a sensor, a geolocation data source, a server, an analytics tool, a mobile device, and a reporting system.

3. The system of claim 1, wherein the at least one model includes at least two models wherein a second model includes a cancel-defer-go live model based on a random forest tree.

4. The system of claim 1, wherein the at least one model includes at least two models wherein a second model includes a regular-extended warranty model based on a support vector machine (SVM).

5. The system of claim 1, wherein the at least one multimodal output comprises a visualization of the generated predictions.

6. A method for providing customer support using predictive analytics, the method comprising:
receiving, by a processor, a first set of data associated with a plurality of users or user accounts from a first data source;
receiving, by the processor, a second set of data associated with a plurality of users or user accounts from a second data source;
preparing, by the processor, the first set of data, wherein preparing the first set of data comprises variable identification, variable selection, model training, and model selection, wherein the variable selection includes selecting variables that represent a decrease in entropy in resulting branches during dataset splits;

training, by the processor, at least one model using the first set of prepared data, wherein the at least one model includes a phase duration forecasting model predicting a duration of each phase of a plurality of product support phases, wherein the phase duration forecasting model is based on a plurality of Poisson models and a support vector machine (SVM) model, wherein each of the plurality of Poisson models and the SVM model of the trained phase duration forecasting model predicts the duration of one of the plurality of product support phases, wherein each trained Poisson model predicts duration of a corresponding one of the plurality of product support phases including count data that is predicted by applying a Poisson regression given one or more independent variables, the trained SVM model generates binary valued duration predictions for a corresponding another one of the plurality of product support phases;

preparing, by the processor, the second set of data, wherein preparing the second set of data comprises variable identification, variable selection, model training, and model selection;

running, by the processor, the second set of data through the trained at least one model;

generating, by the processor, predictions based on running the second set of data through the trained at least one model wherein the predictions from the trained phase duration forecasting model include predictions for the corresponding product support phase durations of each of the plurality of Poisson models and the SVM model;

providing, by the processor, at least one multimodal output based on the generated predictions; and transmitting, by the processor, the at least one multimodal output to a user at a user device, wherein the user device is a computing device having a display.

7. The method of claim 6, wherein the first data source and the second data source each comprise at least one of a website, a document, enterprise resource planning (ERP) system, a database, a web feed, a sensor, a geolocation data source, a server, an analytics tool, a mobile device, and a reporting system.

8. The method of claim 6, the at least one model includes at least two models wherein a second model includes a regular-extended warranty model based on a support vector machine (SVM).

9. The method of claim 6 the at least one model includes at least two models wherein a second rnodel includes a regular-extended warranty model based on a support vector machine (SVM).

10. The method of claim 6, wherein the at least one multimodal output comprises a visualization of the generated predictions.

11. A non-transitory computer-readable storage medium having an executable stored thereon, which when executed instructs a processor to perform the following method:
  receiving a first set of data associated with a plurality of users or user accounts from a first data source;
  receiving a second set of data associated with a plurality of users or user accounts from a second data source;
  preparing the first set of data, wherein preparing the first set of data comprises variable identification, variable selection, model training, and model selection, wherein the variable selection includes selecting variables that represent a decrease in entropy in resulting branches during dataset splits;

training at least one model using the first set of prepared data, wherein the at least one model includes a phase duration forecasting model predicting a duration of each phase of a plurality of product support phases, wherein the phase duration forecasting model is based on a plurality of Poisson models and a support vector machine (SVM) model, wherein each of the plurality of Poisson models and the SVM model predict the duration of one of the plurality of product support phases, wherein each trained Poisson model predicts duration of a corresponding one of the plurality of product support phases including count data that is predicted by applying a Poisson regression given one or more independent variables, the trained SVM model generates binary valued duration predictions for a corresponding another one of the plurality of product support phases;

preparing the second set of data, wherein preparing the second set of data comprises variable identification, variable selection, model training, and model selection;

running the second set of data through the trained at least one model;

generating predictions based on running the second set of data through the trained at least one model wherein the predictions from the phase duration forecasting model include predictions for the corresponding product support phase duration of each of the plurality of Poisson models and the SVM model;

providing at least one multimodal output based on the generated predictions; and transmitting the at least one multimodal output to a user at a user device, wherein the user device is a computing device having a display.

12. The non-transitory computer-readable storage medium of claim 11, wherein the first data source and the second data source each comprise at least one of a website, a document, enterprise resource planning (ERP) system, a database, a web feed, a sensor, a geolocation data source, a server, an analytics tool, a mobile device, and a reporting system.

13. The non-transitory computer-readable storage medium of claim 11, wherein the at least one model includes at least two models wherein a second model includes a cancel-defer-go live model based on a random forest tree.

14. The non-transitory computer-readable storage medium of claim 11, wherein the at least one model includes at least two models wherein a second model includes a regular-extended warranty model based on a support vector machine (SVM).

15. The non-transitory computer-readable storage medium of claim 11, wherein the at least one multimodal output comprises a visualization of the generated predictions.

16. The method of claim 8, further comprising:
  training the cancel-defer-go live model based on the random forest tree using a third set of prepared data.

17. The method of claim 16, further comprising:
  generating predictions for a product solution to be canceled, deferred, and going live as scheduled based on running a fourth set of data through the cancel-defer-go live model trained on the third set of prepared data.

18. The method of claim 9, further comprising:
training the regular-extended warranty model on a fifth set of prepared data.

19. The method of claim 18, further comprising:
generating predictions for a customer to likely require a regular warranty or an extended warranty based on running a sixth set of data through the regular-extended warranty model that is trained on the fifth set of prepared data.

20. The method of claim 6, wherein the plurality of Poisson models of the phase duration forecasting model predict durations for the corresponding product support phases including design phase, build phase, test phase, User Acceptance Testing (UAT) phase, and support phase while the SVM model of the phase duration forecasting model forecasts for a deploy phase.

* * * * *

UNITED STATES PATENT AND TRADEMARK OFFICE
CERTIFICATE OF CORRECTION

PATENT NO. : 11,481,674 B2
APPLICATION NO. : 16/511768
DATED : October 25, 2022
INVENTOR(S) : Earl Josef Mondero et al.

It is certified that error appears in the above-identified patent and that said Letters Patent is hereby corrected as shown below:

In the Claims

At Claim 8, Column 19, Line 47 to Line 50, "The method of claim 6, the at least one model includes at least two models wherein a second model includes a regular-extended warranty model based on a support vector machine (SVM)." should instead read "The method of claim 6, wherein the at least one model includes at least two models wherein a second model includes a cancel-defer-go live model based on a random forest tree.".

At Claim 9, Column 19, Line 51, the phrase "The method of claim 6 the" should instead read "The method of claim 6, the".

Signed and Sealed this
First Day of August, 2023

Katherine Kelly Vidal
*Director of the United States Patent and Trademark Office*